United States Patent [19]

Kataoka et al.

[11] Patent Number: 5,287,445
[45] Date of Patent: Feb. 15, 1994

[54] LAYOUT DISPLAYING APPARATUS FOR A WORD PROCESSOR

[75] Inventors: Misao Kataoka, Mie; Yuri Usami, Nagoya; Manami Yamada, Seto; Kayoko Harada; Chiharu Hori, both of Nagoya, all of Japan

[73] Assignee: Brother Kogyo Kabushiki Kaisha, Nagoya, Japan

[21] Appl. No.: 615,404

[22] Filed: Nov. 19, 1990

[30] Foreign Application Priority Data

Feb. 2, 1990 [JP] Japan ................................ 2-24904

[51] Int. Cl.$^5$ ............................................. G06F 15/20
[52] U.S. Cl. ........................................ 395/148; 395/155
[58] Field of Search ............... 395/148, 146, 144, 145, 395/157, 155

[56] References Cited

U.S. PATENT DOCUMENTS 4,951,233  8/1990  Fujiwara et al. .................... 395/147

OTHER PUBLICATIONS

Apple Computer, "HyperCard User's Guide", 1988, pp. 15-17.
Que Corporation; "Using WorkPerfect 5.1; Special Edition;" pp. 155, 229, 230, 233–235 & 563–564; 1989.

*Primary Examiner*—Gary V. Harkcom
*Assistant Examiner*—Mike Smith
*Attorney, Agent, or Firm*—Oliff & Berridge

[57] ABSTRACT

A layout displaying apparatus has the capability to display a layout of a text in at least one layout display region of a display. The layout displaying apparatus includes a layout display control for displaying a single page of stored data in each layout display region and an extension layout display control for alternatively displaying two adjacent pages of stored data in each layout display region in the form of a double column display.

20 Claims, 8 Drawing Sheets

LAYOUT DISPLAYING APPARATUS FOR A WORD PROCESSOR

BACKGROUND OF THE INVENTION

1. Field of the Invention

The present invention relates to a layout displaying apparatus for use in a word processor and, more particularly, to a layout displaying apparatus which is used to display the layout of document data on a display.

2. Description of the Prior Art

In general, English language word processors, for example, have been provided with displays having a plurality of display lines and a number of functions for facilitating a process for inputting document data and a process for editing the same. In particular, a word processor having a layout display function for converting a train of characters representative of document data into a train of dots or a linear pattern to display the same for each page on a display has been recently put into practical use.

Where it is desired to provide the layout of document data on the display by making use of the layout display function, a desired document is normally displayed on the display and then a "layout" key is operated. Consequently, the document data is deleted from the display, one rectangular layout display region representative of a printing region on the display based on pre-inputted format information related to a printing format is displayed, and the layout of document data corresponding to one page with a cursor displayed thereon within this rectangular layout display region is displayed. At this time, a "next-page" key or a "previous-page" key is operated to display the layout of document data at the next page or the layout of document data at the previous page, respectively, for each page on the display.

As described above, in the word processor of such a type that the layout of the document data corresponding to one page is displayed in one layout display region, problems arise in that the manner of printing effected by a double column printing process, or column-stepped printing process, for printing document data at the first page on the left half of a printing sheet and printing document data at the second page, which is adjacent to the former document data, on the right half of the printing sheet, for example, cannot be simultaneously viewed in the form of the layout display.

SUMMARY OF THE INVENTION

Accordingly, it is an object of the present invention to provide a layout displaying apparatus for a word processor, which is capable of arbitrarily selecting the layout display of one page and the layout display of two pages when the layout of document data is displayed within a layout display region.

It is a further object of the present invention to provide a layout displaying apparatus for a word processor which can perform double column printing layout display.

To achieve the foregoing and other objects, and to overcome the shortcomings discussed above, according to the present invention, there is provided a layout displaying apparatus for a word processor, comprising: storing means for storing document data to be displayed; a display capable of displaying at least one layout display region; setting means for setting a layout display mode in which a layout of the data is to be displayed, the layout comprising at least one page of data; layout display control means for displaying the layout corresponding to the document data stored in the storing means within one layout display region in the display for each page; extension layout display control means for adjacently displaying layouts corresponding to two adjacent pages of document data stored in the storing means within one layout display region; and selecting means for alternatively selecting the layout display control means and the extension layout display control means.

BRIEF DESCRIPTION OF THE DRAWINGS

The invention will be described in detail with reference to the following drawings in which like reference numerals refer to like elements and wherein.

DETAILED DESCRIPTION OF THE PREFERRED EMBODIMENT

A preferred embodiment of the present invention will now be described below with reference to the accompanying drawings. The present embodiment shows a word processor to which the present invention is applied.

Figure 1:
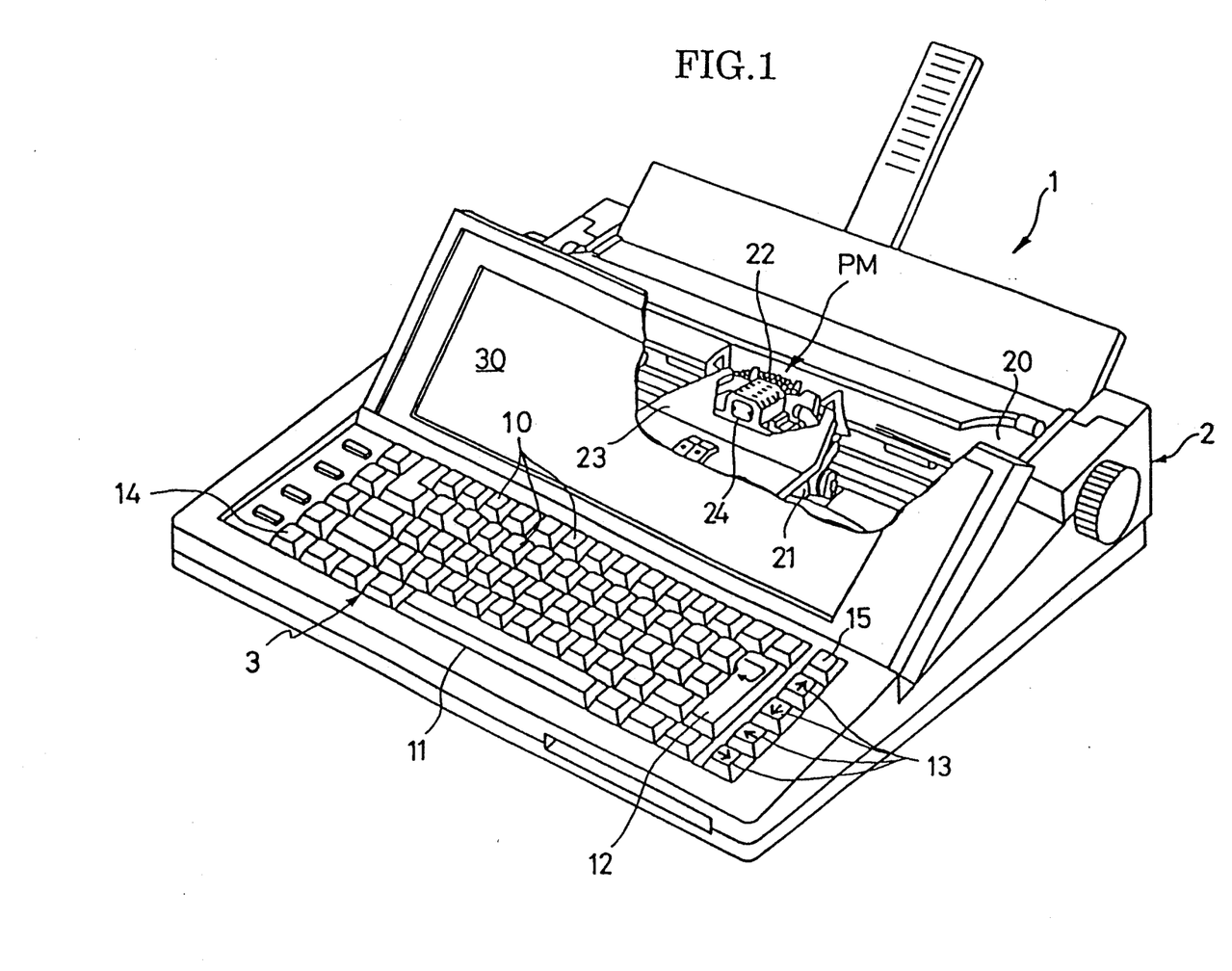
FIG. 1 is a perspective view of a word processor having a layout displaying apparatus according to one embodiment of the present invention.

As shown in FIG. 1, a word processor 1 has a keyboard 3 disposed in front of a main unit frame 2, and a font-wheel type printing mechanism PM disposed in the main unit frame 2 behind the keyboard 3. At a rear portion of the keyboard 3, a liquid crystal display 30 capable of displaying characters and symbols corresponding to 14 lines is pivotably disposed at a position shown in FIG. 1 where it is to be used and at an unillustrated position where it is to be contained. The keyboard 3 is provided with character keys 10 including alphanumeric keys, number keys and symbol keys, a space key 11, a return key 12, cursor movement keys 13 for moving a document cursor in the document or a layout cursor 60 (shown in FIGS. 7(a) and 7(b)) vertically and horizontally, a layout key 14 for setting a layout display mode representative of the layout of document data, a cancel key 15 for canceling the execution of various functions, various function keys, etc.

The printing mechanism PM has a well-known construction. Namely, it comprises a platen 20 for feeding a printing sheet, a carriage 21 movable in the left and right directions along the platen 20, a petal-type daisy wheel 22 having a plurality of fonts formed in the distal ends of spokes protruding in the radial direction, a ribbon cassette 23 having a print ribbon contained therein and a hammer solenoid 24 for hitting the fonts.

Figure 2:
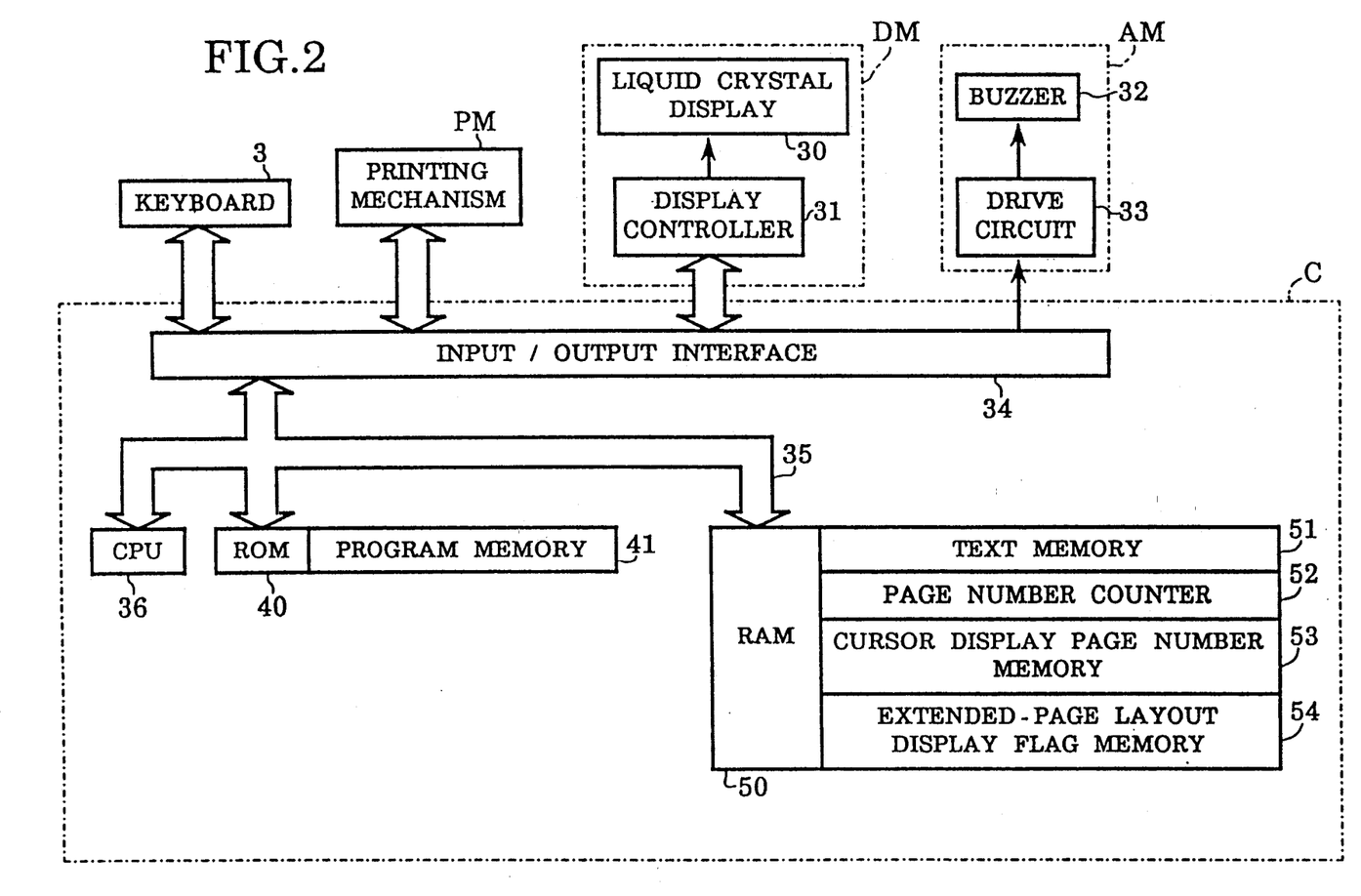
FIG. 2 is a block diagram of a control system of the word processor.

The overall structure of a control system of the word processor 1 will now be described with reference to a block diagram shown in FIG. 2.

The word processor 1 basically comprises the keyboard 3, the printing mechanism PM, a display mechanism DM, an alarm mechanism AM, a controller C, etc. The keyboard 3, the printing mechanism PM, the display mechanism DM, the alarm mechanism AM are connected to an input/output interface 34 in the controller C.

The display mechanism DM has a well-known construction. In other words, it comprises the liquid crystal display 30, and a display controller 31 including a display RAM for outputting display data to the display 30 and a character generator ROM having a number of dot patterns such as characters and symbols contained therein.

The alarm mechanism AM comprises a buzzer 32 and a drive circuit 33 for energizing the buzzer 32 to produce a sound.

The controller C comprises a CPU 36, the input/output interface 34 electrically connected to the CPU 36 via a bus 35 such as a data bus, a ROM 40 and a RAM 50.

A program memory 41 in the ROM 40 stores therein a control program for controlling the printing mechanism PM and the display mechanism DM corresponding to code data input via the keyboard 3, a layout display control program executed when the layout display mode is established (see FIG. 4), and the like.

Figure 5:
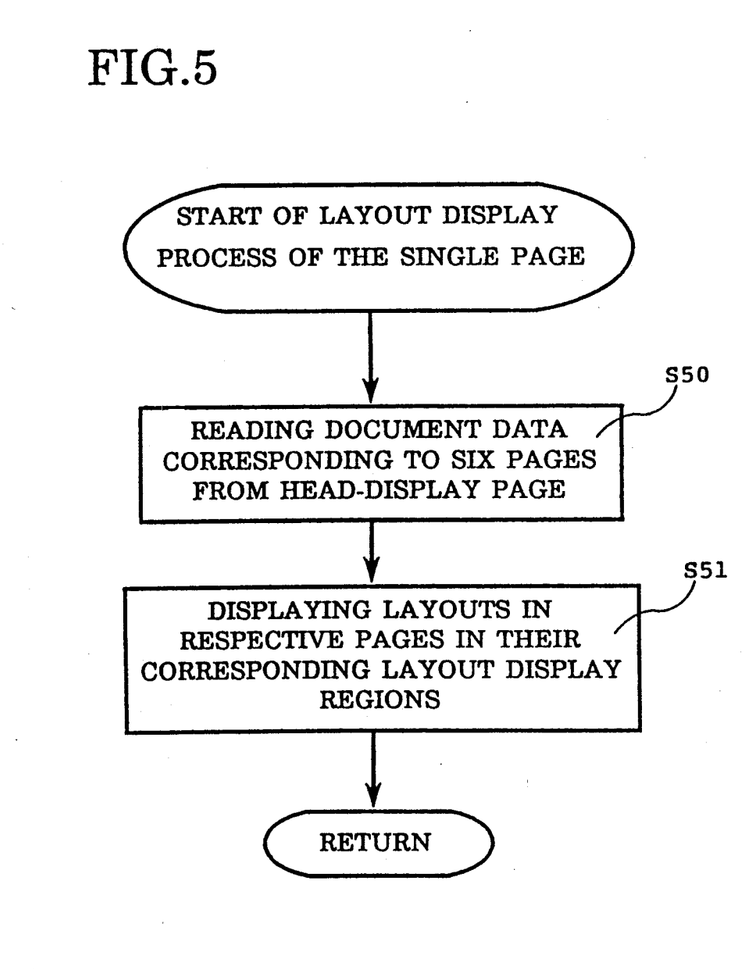
FIG. 5 is a flow chart of a subroutine for processing and controlling a layout display of a single page.
Figure 6:
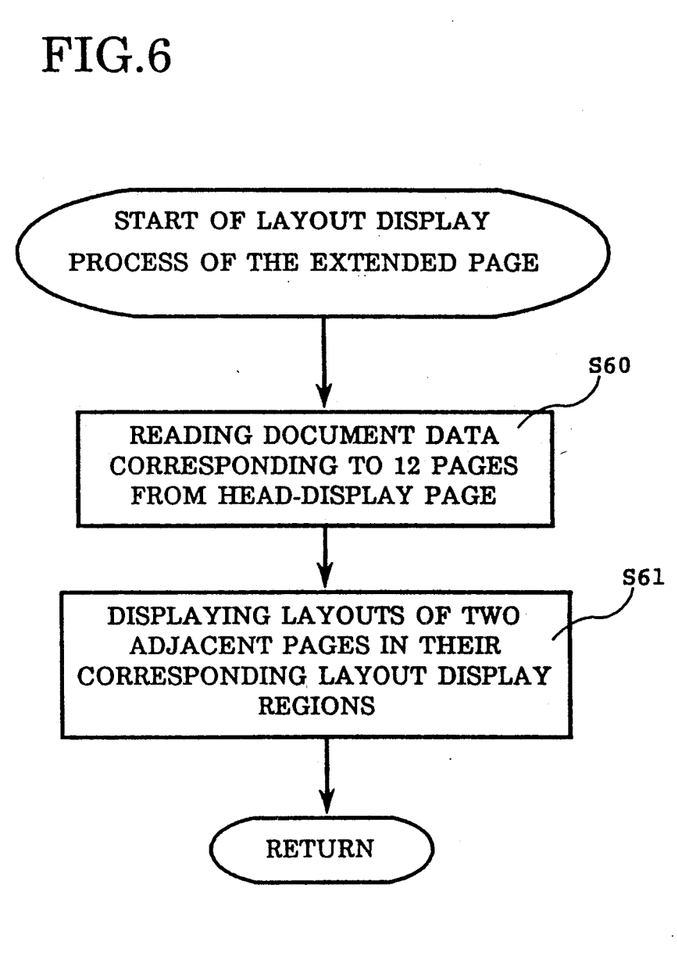
FIG. 6 is a flow chart of a subroutine for processing and controlling a layout display of an extended page.
Figure 7A:
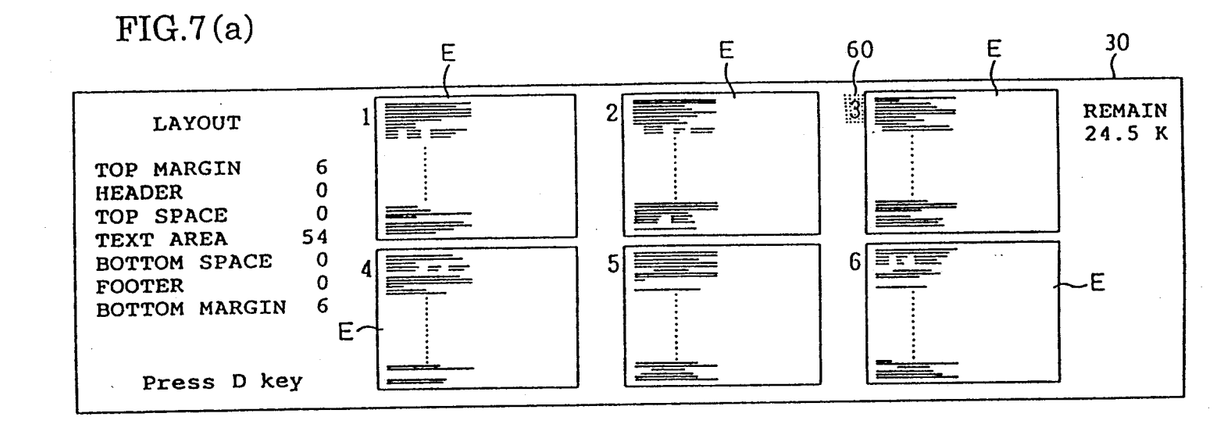
FIGS. 7(a) and 7(b) are diagrams for describing layout displays in a single-page layout display mode and in an extended-page layout display mode, respectively.

The layout display control program has a subroutine for processing and controlling a layout display of a single page (see FIG. 5) and a subroutine for processing and controlling a layout display of an extended page (see FIG. 6) both stored therein. In addition, the layout display control program also stores therein information about the following computation expressions including (1) through (4). Namely, when the extended-page layout display mode is set, a head-display page number S and cursor-display page numbers Md used to newly display the layout cursor 60 are determined in accordance with the following expressions:

$$S = [\text{integer of } \{(I-1)12\}] \times 12 \quad (1)$$

where I represents a counted value of a page number.

$$Md = [M(\text{odd display page number}) + 1]/2 \quad (2)$$

$$Md = [M(\text{even display page number})]/2 \quad (3)$$

where M represents a cursor-display page number, e.g., the numerals 1 through 6 in FIG. 7(a), before the extended-page layout display mode is set. Further, when the single-page layout display mode is established, the head-display page number S is determined in accordance with the following expression:

$$S = [\text{integer of } \{(I-1)/6\}] \times 6 + 1 \quad (4)$$

The counted value of a page number, I, represents the location of the document cursor in the document data. When the single-page layout display mode is established, the counted value of a page number is identical to the cursor display page number. When, however, the extended-page layout display mode is established, the cursor display page number changes in accordance with above expressions (2) and (3). For example, when the document cursor is located at page 3 of the document data and the extended-page layout display mode is established, the cursor display page number, 2, is determined in accordance with expression (2). When the document cursor is located at page 4 of the document data and the extended-page layout display mode is established, the same cursor display page number, 2, is determined in accordance with expression (3). When the document cursor is located at page 3 of the document data and the single-page layout display mode is established, the cursor display page number is also 3.

Both the subroutine for processing and controlling the layout display of the single page and the subroutine for processing and controlling the layout display of the extended page include a subroutine for converting a train of characters of read document data into a train of dots and controlling the same.

Figure 3:
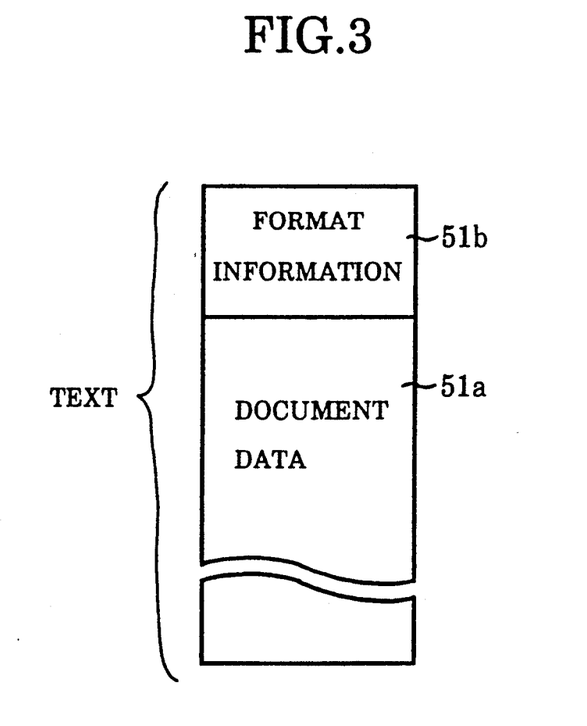
FIG. 3 is a schematic view for describing the structure of a document stored in a text memory.

The RAM 50 comprises a text memory 51 for storing therein document data indicative of a plurality of input document data, a page number counter 52 (whose counted value is represented as I) for storing therein data having a page number with the document cursor displayed thereon from document data having respective page numbers and displayed on the display 30, a cursor display page number memory 53 for storing therein the cursor display page number (M) with the layout cursor 60 displayed thereon from display page numbers marked in layout display regions E in which each layout is displayed, an extended-page layout display flag memory 54 for storing therein an extended-page layout display flag F set when the extended-page layout display mode is established by the depressing operation of the "D" character key 10 and reset when the single-page layout display mode is set, and various memories for temporarily storing therein the results of computation of the CPU 36. However, as shown in FIG. 3, format information 51b related to a printing format, which is input upon creation of document data format, is stored in top areas of each of a plurality of documents stored in the text memory 51 in association with the document data 51a. In addition, the respective document data 51a include therein margin codes with set position data, which are set by an unillustrated left-margin or right-margin set key.

The format information 51b has printing format information which includes the number of print lines representative of the document data 51a corresponding to one page or the like, the printing format information being used to perform printing processing of the document data 51a.

Figure 4A:
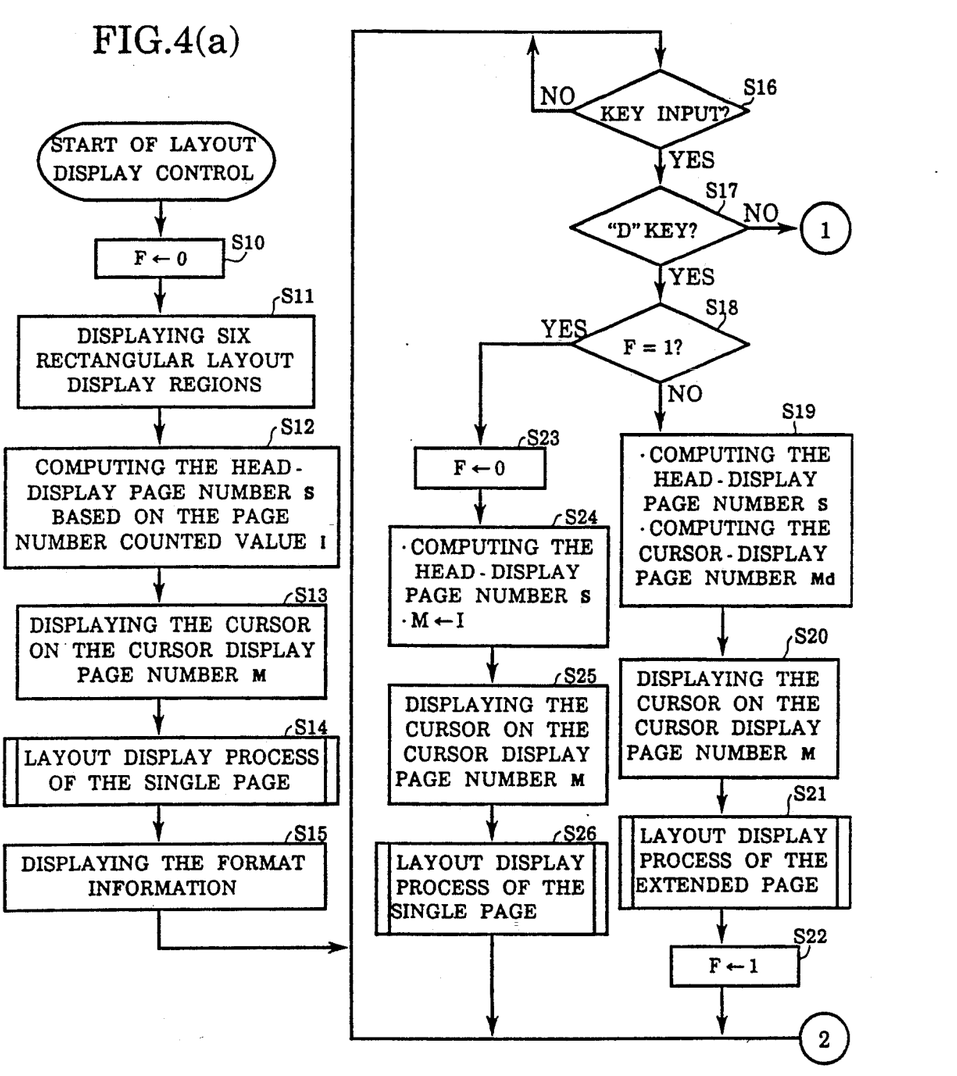
FIGS. 4(a) and 4(b) are the schematic flow charts of a routine for controlling a layout display.
Figure 4B:
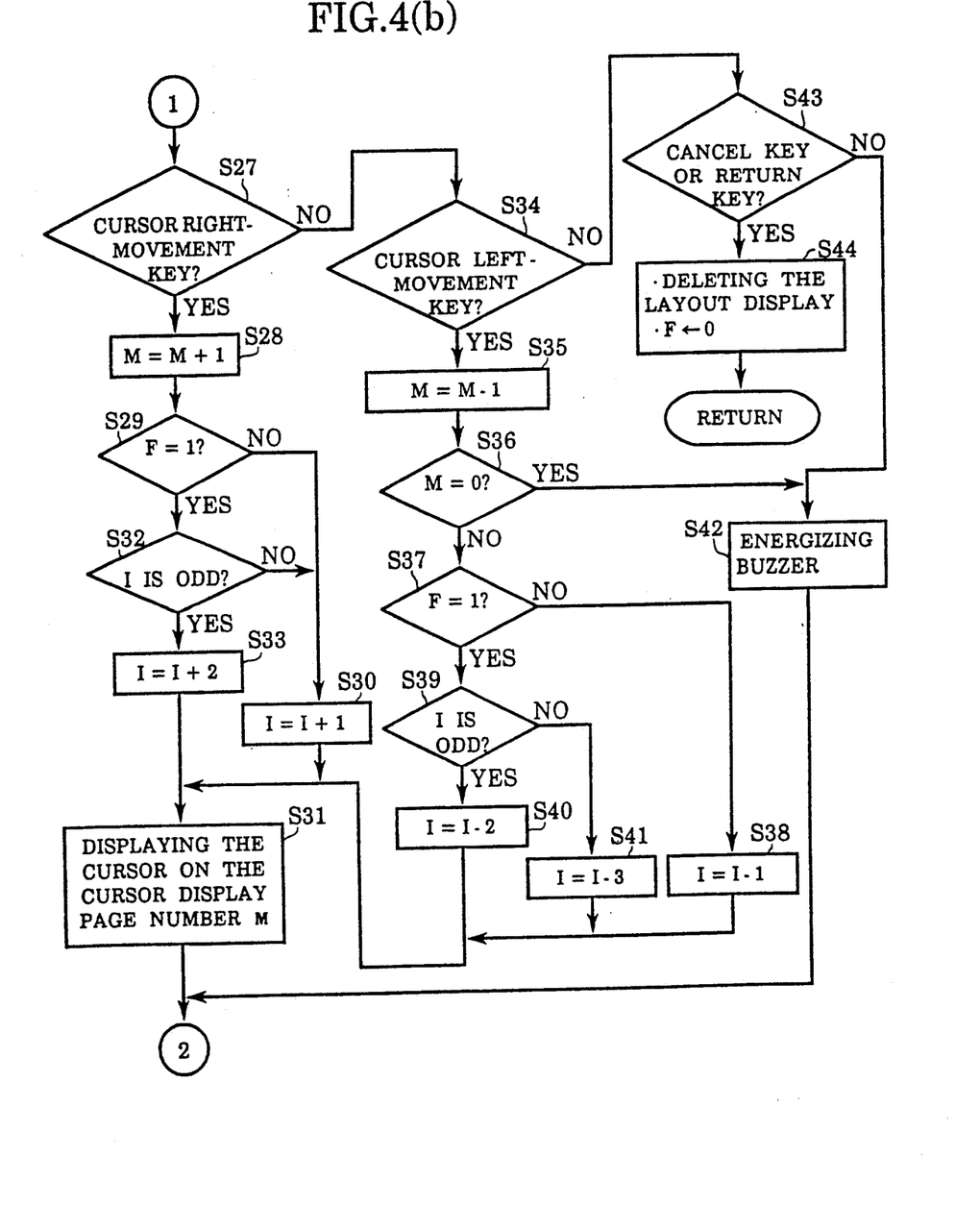

A description will now be made of a routine for controlling a layout display, which is performed by the controller C in the word processor 1, in accordance with a flow chart shown in FIGS. 4(a) and 4(b). In the drawing, the reference character Si (i=1, 2, 3, . . . ) represents each of the steps. At a stage prior to the start of this control routine, the following is performed, i.e., desired document data read from the text memory 51 is displayed on the display 30 or newly inputted document data is displayed on the display 30. In addition, the page number with the layout cursor 60 displayed thereon is sequentially increased by a cursor control program (not shown in the drawing) based on expressions (2) and (3) according to the movement in the layout cursor 60 and then stored in the page number counter 52.

Then, the layout key 14 is operated to start the control shown in FIG. 4. Initially, the single-page layout display mode is set so that the extended-page layout display flag F is reset (in S10). Then, six rectangular layout display regions E shown in FIG. 7(a), in which one horizontal side is represented as 8.5 inches (85 characters/pica pitch) and one vertical side is represented as the number of lines set based on the format information, are displayed on the display 30 (in S11). In addition, the head-display page number S is computed based on the page number counted value I and the above expression (4) and layout display region numbers are then displayed on their corresponding six layout display regions E following the determination of the head-display page number S (in S12). Furthermore, the page number counted value I is stored in the cursor display page number memory 53 as M, and the layout cursor 60 is displayed on the cursor display page number M (in S13). The procedure (see FIG. 5) for processing and controlling the layout display of the single page (in S14) is thus executed.

When this procedure is initiated, document data corresponding to six pages from the head display page number S is first read based on data representative of the number of print lines corresponding to one page, which have been stored in the format information 51b, and on line-feed data included in the document data 51a (in S50). Layout is obtained by converting a train of characters in respective pages representative of the document data corresponding to the read six pages into a train of dots. One character is represented as one dot displayed in its corresponding layout display regions E (in S51). The procedure for processing and controlling this layout display is then completed and, thereafter, the format information 51b stored in each of the top areas of the document data 51a, the free storage of the RAM 50 and the like are displayed (in S15). If the layout key 14 is operated when document data corresponding to ten pages exists in a selected desired document and the document cursor is positioned on the third page displayed in the display 30, layouts of data corresponding to six pages from the first page to the sixth page from the document data referred to above are displayed on their corresponding layout display regions E (see FIG. 7(a)), and the layout cursor 60 is displayed on a layout display region number "3". Further, displayed on the left margin of the display 30 are "TOP MARGIN 6", "HEADER 0" for setting either the presence or absence of the title to be printed on the top line of each page, "TOP SPACE 0" for setting an interval between "HEADER" and "TEXT AREA", and the format information including respective items, i.e., "TEXT AREA 54", "BOTTOM SPACE 0", "FOOTER 0" and "BOTTOM MARGIN 6".

Then, when the "D" character key 10 is operated to select the extended-page layout display mode (Yes in S16 and S17) and when the single-page layout display mode has already been set (No in S18), the head-display page number S is arithmetically determined in accordance with the expression (1), and the cursor-display page number Md is computed in accordance with the expression (2) or (3) to be stored in the cursor display page number memory 53 as M (in S19). Then, six layout display region numbers are respectively displayed based on the results of computation obtained in accordance with the expression (S+1)/2 using the head-display page number S, and the layout cursor 60 is displayed on the cursor display page number M (in S20). The procedure for processing and controlling the layout display of the extended page (see FIG. 6) is thus executed (in S21).

Figure 7B:
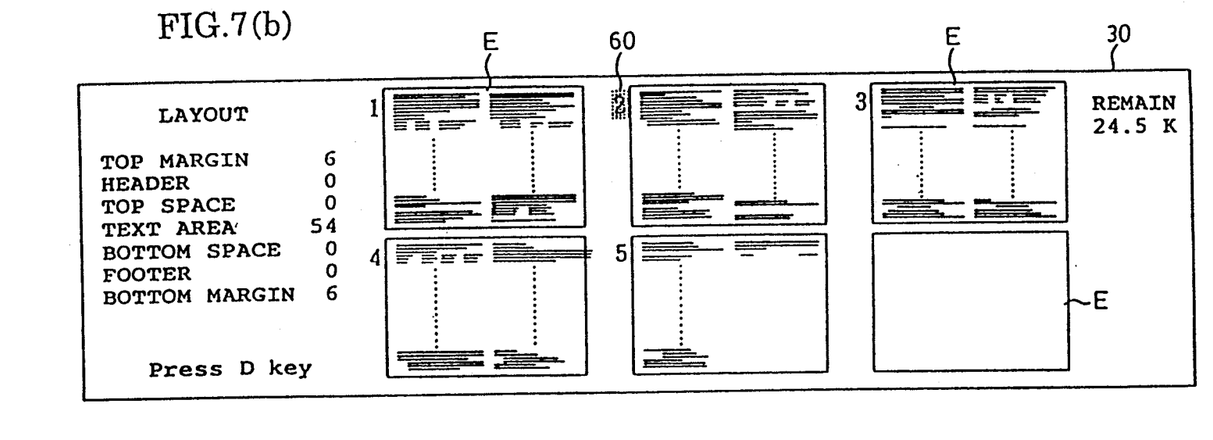

When this process/control procedure is initiated, document data corresponding to twelve pages from the head-display page number S is read (in S60). Layouts of document data corresponding to two pages comprising an odd-numbered page and an even-numbered page, both of which are mutually adjacent to each other from previous page numbers, the document data being selected out of document data corresponding to the read twelve pages, are displayed in their corresponding layout display regions E (in S61). This procedure is then terminated, and the extended-page layout display flag F is set (in S22). The routine is thereafter returned to S16. At this time, the two layouts displayed in the respective layout display regions E are spaced apart from each other by the number of characters predetermined in the printing format or the like, for example. Further, when the position where document data at an even-numbered page, which is disposed on the right half of the layout display region E, is to be line-fed and the position is overrun five characters or more toward the right from the right margin of a printing sheet (e.g., a letter size), the document data is displayed on the display 30 in a state in which it is overrun four dots toward the right from the layout display region E. As shown in FIG. 7(a) by way of example, when the character key "D" is operated while the layout cursor 60 is being displayed on the layout display region number "3", the layouts of the first and second pages are displayed in the layout display region E of the layout display region number "1" in a state in which they are mutually adjacent to each other, as shown in FIG. 7(b). Likewise, the layouts of the third and fourth pages are displayed in the layout display region E of the layout display region number "2" in a state in which they are mutually adjacent to each other. As described above, since the document data corresponding to ten pages exist in the document which is being selected at present, every two pages of the layouts of data are hereinafter displayed in the layout display region E up to the layout display region number "5" in the same manner as described above. In this case, the layout cursor 60 is displayed on the layout display region number "2". As shown in the layout display region number "4", when the position where the document data at the eighth page is to be line-fed is overrun five characters or more from the right margin of the printing sheet, the document data is thus displayed on the display 30 in a state in which it is overrun four dots from the layout display region E.

On the other hand, when the "D" character key 10 is operated again to select the single-page layout display mode following use of the extended-page layout display mode (Yes in S16, S17 and S18), the extended-page layout display flag F is reset (in S23), and the head-display page number S is computed in accordance with the expression (4). In addition, the value I counted by the page number counter 52 is stored in the cursor display page number memory 53 as M (in S24). Then, six layout display region numbers are respectively displayed in turn from the head-display page number S, and the layout cursor 60 is displayed on the cursor display page number M (in S25). The procedure for processing and controlling the layout display of the single page is then executed (in S26). As shown in FIG. 7(b) by way of example, when the character key "D" is operated again at the time that the layout of the document data is visually represented in the extended-page layout display mode, layouts of document data corresponding to the first to sixth pages are displayed on the display 30 in the single-page layout display mode as depicted in FIG. 7(a).

When the cursor right-movement key 13 is operated while the layout of document data is displayed in either the single-page layout display mode or the extended-page layout display mode (Yes in S16 and S27), the cursor display page number M is increased by 1 (in S28). Where the single-page layout display mode is set (No in S29), the counted value I is increased by 1 (in S30). The layout cursor 60 is thereafter displayed on the cursor display page number M (in S31) and the routine is returned to S16. On the other hand, when the counted value I is an odd number at the time the extended-page layout display mode is set (Yes in S29 and S32), the value I is increased by 2 (in S33). When the counted value I is an even number at the time the extended-page layout display mode is set (Yes in S29 and No in S32), the value I is increased by 1 (in S30). The routine is thereafter returned to S16 after passage through S31. On the other hand, when the cursor left-movement key 13 is operated (Yes in S16 and S34), the cursor display page number M is decreased by 1 (in S35). When the cursor-display page number M is not "0" (No in S36) and the single-page layout display mode is set (No in S37), the counted value I is decreased by 1 (in S38). The routine is thereafter returned to S16 after completion of S31. When the counted value I is an odd number at the time the extended-page layout display mode is set (Yes in S37 and S39), the value I is decreased by 2 (in S40). On the other hand, when the counted value I is an even number at the time the extended-page layout display mode is established (Yes in S37 and No in S39), the value I is decreased by 3 (in S41). The routine is thereafter returned to S16 upon completion of S31.

Further, when the cancel key 15 or the return key is operated at the time either the single-page layout display mode or the extended-page layout display mode is set (Yes in S16 and S43), the layout display is completely deleted and the extended-page layout display flag F is reset (in S44). The procedure is then returned to a main routine and document data on a page indicated by the counted value I is displayed on the display 30. Now, when keys other than the "D" character key 10, the cursor right/left-movement key 13, the cancel key 15 and the return key 12 are operated (No in S43) and when the cursor-display page number M is "0" (Yes in S36), the buzzer 32 is energized to produce a sound (in S42) and the routine is returned to S16.

Alternative embodiments of the present invention can be provided. In one such embodiment, when the cursor down-movement key 13 is now operated, the layout of document data may be displayed in the layout display region of a layout display region number obtained by adding "3" to each of the six layout display region numbers which are displayed at present. When the cursor up-movement key 13 is now operated, the layout of document data may be displayed in that region of a layout display region number obtained by subtracting "3" from each of the six layout display region numbers. For example, with reference to FIG. 7(a), when the cursor down-movement key 13 is operated while the layout cursor 60 is located at layout display region number 3, the layout of document data displayed in region number 6 is displayed.

When the cancel key 15 is now operated in the course of displaying the layout of document data in the layout display region E, the document data on a page in which the layout display is discontinued may be displayed on the display 30.

A single-page key for setting the single-page layout display mode and an extended-page key for setting the extended-page layout display mode can be separately provided such that when layout key 14 is operated, the layout of document data may be displayed in a layout display mode set by these page keys.

Incidentally, the layout display regions E to be displayed are not necessarily limited to six. Additional layout display regions may also be displayed.

Figure 8:
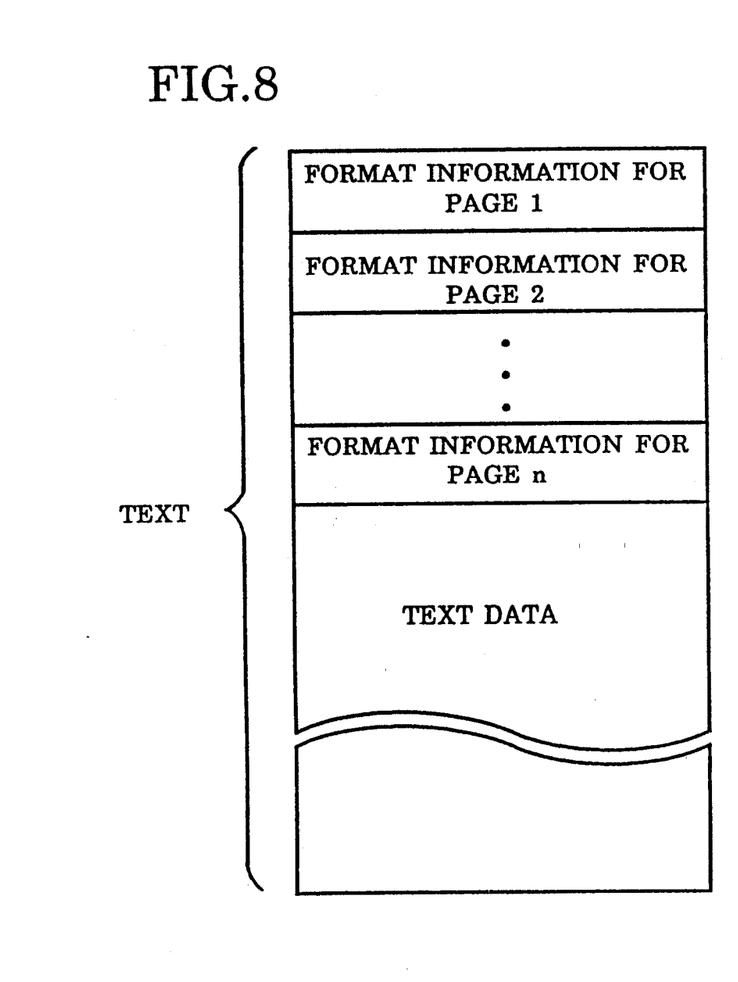
FIG. 8 schematically shows a document structure according to another embodiment of the present invention, which corresponds to that in FIG. 3.
Figure 9:
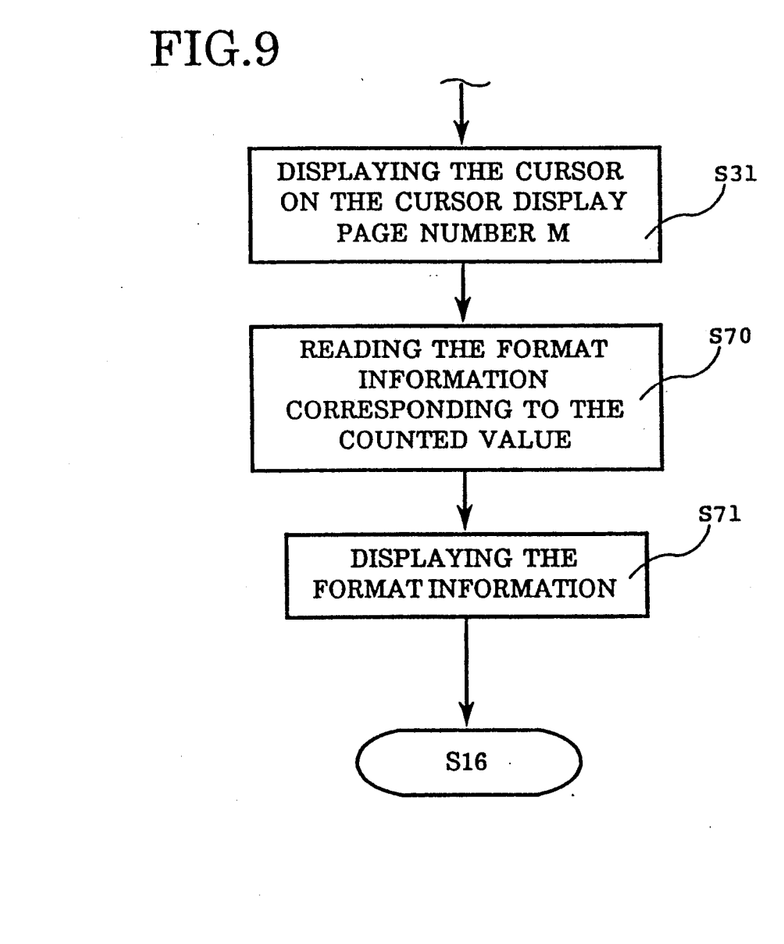
FIG. 9 depicts a schematic flow chart of a routine according to another embodiment of the present invention, which corresponds to that in FIG. 4.

As shown in FIG. 8, where a plurality of format information set for each page are stored in the top area of documents stored in the text memory 51, the routine for controlling the layout display, as described in the aforementioned embodiment, may partly be changed by adding S70 and S71 to the stage subsequent to S31, as depicted in FIG. 9 to display the format information corresponding to the counted value I of the page number. This enables the user to readily identify the format information.

More specifically, when the layout cursor 60 is displayed on the cursor-display page number M (in S31), format information corresponding to a value counted by the page number counter 52 from the plurality of format information stored in the top area of the document data is read (in S70) and then displayed on the display 30 (in S71). The routine procedure is thereafter returned to S16.

As has been described above, when the layout of document data is displayed within the layout display region E, the single-page layout display process/control procedure for displaying the layout of one page and the extended-page layout display process/control procedure for displaying the layout of two pages can be alternatively selected. Therefore, the layout of document data corresponding to one page or the layout of document data corresponding to two pages can arbitrarily and easily be selected to be displayed within the layout display region E.

Further, a group of display page numbers corresponding to six pages displayed at a time is correlated with the head-display page number S of the group in the single-page layout display mode. In this case, when a display page group table having this correlation is stored in the ROM 40 and the single-page layout display mode is established, the head-display page number S may be determined based on the counted value I of the page number and the display page group table.

The present invention can be applied to various word processors capable of performing the layout display, such as an English language word processor and a Japanese language word processor of the type wherein floppy disk drive devices are provided and document data is stored on floppy disks.

While the invention has been described in conjunction with specific embodiments thereof, it is evident that many alternatives, modifications and variations will be apparent to those skilled in the art. For example, while the disclosure describes a liquid crystal display, other types of display devices could be used including a CRT, printer, etc. Accordingly, the preferred embodiments of the invention as set forth herein are intended to be illustrative, not limiting. Various changes may be made without departing from the spirit and scope of the invention as defined in the following claims.

What is claimed is:

1. A layout displaying apparatus for a word processor, comprising:
   storing means for storing document data to be displayed;
   a display capable of simultaneously displaying a plurality of layout display regions;
   setting means for setting a layout display mode in which a layout of the data is to be displayed on said display, the layout comprising at least one page of data;
   layout display control means for displaying the layout corresponding to the document data stored in the storing means within one layout display region in the display for each page;
   extension layout display control means for adjacently displaying a plurality of layouts, each of the plurality of layouts corresponding to at least two adjacent pages of document data stored in the storing means and being displayed within at least one of said plurality of layout display regions; and
   selecting means for alternatively selecting for each of the plurality of layout display regions the layout display control means and the extension layout display control means when said setting means sets the layout display mode.

2. The layout displaying apparatus as recited in claim 1, wherein said extension layout display control means displays two adjacent pages in a double columnar form within one layout display region.

3. The layout displaying apparatus as recited in claim 1, further comprising converter means for converting data to a series of dots for display in the layout display region.

4. The layout displaying apparatus as recited in claim 1, further comprising a page number counting means for storing page number data representative of the page number at which a cursor is located in the document.

5. The layout displaying apparatus as recited in claim 1, further comprising cursor display page number memory means for storing a cursor display page number at which a cursor is located in the layout display region.

6. The layout displaying apparatus as recited in claim 1, further comprising means for storing print format information, said print format information being used to process the stored document data.

7. The layout displaying apparatus as recited in claim 6, further comprising display means for displaying the format information.

8. The layout displaying apparatus as recited in claim 1, further comprising input means for inputting said document data.

9. The layout displaying apparatus as recited in claim 1, wherein said layout display control means is initially executed in response to a layout display mode being set by said setting means.

10. The layout displaying apparatus as recited in claim 1, wherein said setting means selectively sets one of the layout display mode and a document display mode in which the document data stored in the storing means is to be displayed on the display means.

11. The layout displaying apparatus as recited in claim 1, wherein said layout display control means displays a plurality of layouts within each of said plurality of layout display regions, each of the plurality of layouts corresponding to at least one page of document data stored in the storing means.

12. The layout displaying apparatus as recited in claim 11, wherein said setting means selectively sets the layout display mode and a document display mode in which the document data stored in the storing means is to be displayed on the display means.

13. The layout displaying apparatus as recited in claim 12, further comprising document page designating means for designating one of the plural pages of the document data stored in the storing means, page number storing means for storing page number data representing the number of a page designated by the document page designating means, layout region designating means for designating one of the plural layout display regions, and page number changing means for updating the page number data stored in the page number storing means to correspond to a page number of a layout display region designated by the layout region designating means, and wherein the display means displays the document data of a page represented by the page number data in the page number storing means when the setting means sets the document display mode.

14. The layout displaying apparatus as recited in claim 13, wherein said document page designating means includes cursor moving means for moving a cursor on said display means.

15. The layout displaying apparatus as recited in claim 13, wherein said layout region designating means includes cursor moving means for moving a cursor on said display means.

16. A layout displaying apparatus for a word processor comprising:
   input means for inputting document data;
   storing means for storing a plurality of pages of document data input from the input means;
   display means capable of simultaneously displaying a plurality of layout display regions thereon;
   setting means for setting a layout display mode in which layouts of a plurality of pages of the document data are to be displayed on said display means; and
   extension layout display control means for adjacently displaying a plurality of layouts, each of the plurality of layouts corresponding to at least two adjacent pages of the plurality of pages of the document data stored in the storing means and being displayed within each of the plurality of layout display regions when said setting means sets the layout display mode.

17. The layout displaying apparatus as recited in claim 16, further comprising document page designating means for designating one of the plural pages of the document data stored in the storing means, and page determining means for determining pages of the layouts to be displayed in the plural layout display regions from among the plural pages of the document data in the storing means, according to the page designated by the document page designating means.

18. The layout displaying apparatus as recited in claim 17, wherein the page determining means includes first determining means for determining pages of the layouts to be displayed in the plural layout display regions by the operation of the layout display controls means and second determining means for determining pages of the layouts to be displayed in the plural layout display regions by the operation of the extension layout display control means.

19. The layout displaying apparatus as recited in claim 17, wherein the page determining means determines a head page of pages of the layouts to be displayed in the plural layout display regions according to the page designated by the document page designating means and the number of pages to be displayed from the head page according to selection by the selecting means.

20. The layout display apparatus as recited in claim 9, further comprising:

single layout display control means for displaying a plurality of layouts, each of the plurality of layouts corresponding to each of the plurality of pages of document data stored in the storing means within each of the plurality of layout display regions when the layout display mode is set by said setting means; and selecting means for alternatively selecting for each of the plurality of layout display regions the single layout display control means and the extension layout display control means when the layout display mode is set by said setting means.

* * * * *